US011292743B2

(12) United States Patent
Choi et al.

(10) Patent No.: US 11,292,743 B2
(45) Date of Patent: Apr. 5, 2022

(54) ENAMEL COMPOSITION, METHOD OF PREPARING SAME, AND COOKING APPLIANCE

(71) Applicant: LG ELECTRONICS INC., Seoul (KR)

(72) Inventors: Suyeon Choi, Seoul (KR); Young Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 16/676,903

(22) Filed: Nov. 7, 2019

(65) Prior Publication Data

US 2020/0148583 A1 May 14, 2020

(30) Foreign Application Priority Data

Nov. 9, 2018 (KR) ........................ 10-2018-0137475

(51) Int. Cl.
*C03C 8/04* (2006.01)
*F24C 15/00* (2006.01)

(52) U.S. Cl.
CPC .............. *C03C 8/04* (2013.01); *F24C 15/005* (2013.01)

(58) Field of Classification Search
CPC .................................... C03C 8/04; C03C 8/06
See application file for complete search history.

(56) References Cited

U.S. PATENT DOCUMENTS

| | | | |
|---|---|---|---|
| 3,547,098 | A | 12/1970 | Lee |
| 3,718,498 | A | 2/1973 | Denny et al. |
| 4,084,975 | A | 4/1978 | Faust |
| 4,147,835 | A | 4/1979 | Nishino et al. |
| 4,180,482 | A | 12/1979 | Nishino et al. |
| 4,460,630 | A | 7/1984 | Nishino et al. |
| 4,515,862 | A | 5/1985 | Maki et al. |
| 4,877,758 | A | 10/1989 | Lee et al. |
| 5,650,364 | A | 7/1997 | Münstedt et al. |
| 5,747,395 | A | 5/1998 | Smith et al. |

(Continued)

FOREIGN PATENT DOCUMENTS

| | | |
|---|---|---|
| AU | 2370367 | 1/1969 |
| BG | 98027 | 3/1994 |

(Continued)

OTHER PUBLICATIONS

European Search Report dated Jun. 24, 2020 issued in EP Application No. 20158729.2.

(Continued)

*Primary Examiner* — Karl E Group
(74) *Attorney, Agent, or Firm* — Ked & Associates, LLP

(57) ABSTRACT

An enamel composition may be applied to an inner surface of cooking appliance to facilitate cleaning. The enamel composition may include: $SiO_2$ at 25 to 50 wt %; $B_2O_3$ at 1 to 15 wt %; one or more selected from among $Li_2O$, $Na_2O$, $K_2O$, and NaF at 10 to 30 wt %; ZnO at 1 to 15 wt %; $MoO_3$ at 1 to 15 wt %; and one or more selected from among $TiO_2$, $Bi_2O_3$, NiO, $Co_3O_4$, and $CeO_2$ at 10 to 30 wt %.

18 Claims, 4 Drawing Sheets

1
12
11
13
15
16
14

(56) References Cited

U.S. PATENT DOCUMENTS

| | | | |
|---|---|---|---|
| 6,123,874 | A | 9/2000 | Fukaya et al. |
| 6,321,569 | B1 | 11/2001 | Sreeram et al. |
| 6,429,161 | B1 | 8/2002 | Souchard et al. |
| 6,566,289 | B2 | 5/2003 | Aronica et al. |
| 7,763,557 | B2 | 7/2010 | Baldwin et al. |
| 2003/0119647 | A1 | 6/2003 | Sanichi et al. |
| 2003/0187118 | A1 | 10/2003 | Aronica et al. |
| 2004/0043053 | A1 | 3/2004 | Yu et al. |
| 2004/0069764 | A1 | 4/2004 | Imai et al. |
| 2005/0148722 | A1 | 7/2005 | Aronica et al. |
| 2008/0044488 | A1 | 2/2008 | Zimmer et al. |
| 2009/0311514 | A1 | 12/2009 | Shon et al. |
| 2010/0009837 | A1 | 1/2010 | Sakoske |
| 2010/0264126 | A1 | 10/2010 | Baek et al. |
| 2011/0011423 | A1 | 1/2011 | Baek et al. |
| 2011/0049122 | A1 | 3/2011 | Baek et al. |
| 2011/0174826 | A1 | 7/2011 | Le Bris et al. |
| 2011/0262758 | A1 | 10/2011 | Benford, Jr. et al. |
| 2011/0277505 | A1 | 11/2011 | Sakoske |
| 2013/0149444 | A1 | 6/2013 | Le Bris et al. |
| 2013/0299482 | A1 | 11/2013 | Kim et al. |
| 2013/0299484 | A1 | 11/2013 | Lee et al. |
| 2015/0083109 | A1 | 3/2015 | Baek et al. |
| 2018/0170797 | A1 | 6/2018 | Gorecki et al. |
| 2018/0215654 | A1 | 8/2018 | Choi et al. |
| 2018/0215655 | A1 | 8/2018 | Kim et al. |
| 2019/0002336 | A1 | 1/2019 | Kim et al. |
| 2019/0092680 | A1 | 3/2019 | Kim et al. |
| 2019/0337837 | A1 | 11/2019 | Kim et al. |
| 2020/0115274 | A1 | 4/2020 | Awagakubo et al. |
| 2020/0148583 | A1 | 5/2020 | Choi et al. |
| 2020/0270167 | A1* | 8/2020 | Choi ..................... F24C 15/005 |
| 2020/0270168 | A1* | 8/2020 | Choi ....................... A47J 36/04 |
| 2020/0270171 | A1 | 8/2020 | Gwoo et al. |

FOREIGN PATENT DOCUMENTS

| | | | |
|---|---|---|---|
| CN | 1042890 | | 6/1990 |
| CN | 1105343 | | 7/1995 |
| CN | 1108626 | | 9/1995 |
| CN | 1176942 | | 3/1998 |
| CN | 1487240 | | 4/2004 |
| CN | 101067207 | | 11/2007 |
| CN | 101094818 | | 12/2007 |
| CN | 101182119 | | 5/2008 |
| CN | 101519276 | | 9/2009 |
| CN | 101734858 | | 6/2010 |
| CN | 102066011 | | 5/2011 |
| CN | 102089253 | | 6/2011 |
| CN | 102219383 | | 10/2011 |
| CN | 102368933 | | 3/2012 |
| CN | 102422085 | | 4/2012 |
| CN | 104891805 | | 9/2015 |
| CN | 105621889 | | 6/2016 |
| CN | 106957149 | | 7/2017 |
| CN | 107513747 | | 12/2017 |
| CN | 108059341 | | 5/2018 |
| CN | 108675636 | | 10/2018 |
| EP | 0 086 109 | | 8/1983 |
| EP | 0 453 897 | | 10/1991 |
| EP | 0 565 941 | | 10/1993 |
| EP | 1 160 283 | | 12/2001 |
| EP | 1 256 556 | | 11/2002 |
| EP | 1 298 099 | | 4/2003 |
| EP | 1 559 692 | | 8/2005 |
| EP | 2 662 341 | | 11/2013 |
| EP | 3 357 877 | | 8/2018 |
| EP | 3 459 914 | | 3/2019 |
| EP | 3 578 525 | | 12/2019 |
| EP | 3 650 414 | | 5/2020 |
| GB | 1 214 261 | | 12/1970 |
| HU | 01 00796 | | 8/2002 |
| JP | S54-77618 | | 6/1979 |
| JP | S54-106529 | | 8/1979 |
| JP | S55-75740 | | 6/1980 |
| JP | S56-78450 | | 6/1981 |
| JP | 63230537 | A * | 9/1988 |
| JP | 63230538 | A * | 9/1988 |
| JP | 2001-080935 | | 3/2001 |
| JP | 2001-303276 | | 10/2001 |
| JP | 2002-367510 | | 12/2002 |
| JP | 2003-206417 | | 7/2003 |
| JP | 2004-269322 | | 9/2004 |
| JP | 2004-358846 | | 12/2004 |
| JP | 2005-008974 | | 1/2005 |
| JP | 2014-148465 | | 8/2014 |
| JP | 2014-221937 | | 11/2014 |
| JP | 2016-030849 | | 3/2016 |
| KR | 10-2011-0023079 | | 3/2011 |
| KR | 10-2013-0125910 | | 11/2013 |
| KR | 10-2013-0125918 | | 11/2013 |
| KR | 10-2014-0014658 | | 2/2014 |
| KR | 10-2014-0115562 | | 10/2014 |
| KR | 10-1476501 | | 12/2014 |
| KR | 10-2018-0089986 | | 8/2018 |
| KR | 10-2018-0089988 | | 8/2018 |
| RU | 2007112383 | | 10/2008 |
| WO | WO 95/09131 | | 4/1995 |
| WO | WO 01/92413 | | 12/2001 |
| WO | WO 02/02471 | | 1/2002 |
| WO | WO 03/008354 | | 1/2003 |
| WO | WO 2018/143704 | | 8/2018 |
| WO | WO 2018/198986 | | 11/2018 |
| WO | WO 2019/203565 | | 10/2019 |

OTHER PUBLICATIONS

European Search Report dated Jun. 24, 2020 issued in EP Application No. 20158736.7.

European Search Report dated Jun. 24, 2020 issued in EP Application No. 20158756.5.

European Search Report dated Jun. 29, 2020 issued in EP Application No. 20158751.6.

European Search Report dated Jul. 22, 2020 issued in EP Application No. 20158670.8.

European Search Report dated Jul. 22, 2020 issued in EP Application No. 20158683.1.

European Search Report dated Jul. 22, 2020 issued in EP Application No. 20158690.6.

U.S. Appl. No. 16/666,979, filed Oct. 29, 2019.

U.S. Appl. No. 16/676,903, filed Nov. 7, 2019.

U.S. Appl. No. 16/795,923, filed Feb. 20, 2020.

U.S. Appl. No. 16/795,959, filed Feb. 20, 2020.

U.S. Appl. No. 16/796,066, filed Feb. 20, 2020.

U.S. Appl. No. 16/796,052, filed Feb. 20, 2020.

U.S. Appl. No. 16/796,075, filed Feb. 20, 2020.

U.S. Appl. No. 16/796,102, filed Feb. 20, 2020.

U.S. Appl. No. 16/796,127, filed Feb. 20, 2020.

European Search Report dated Mar. 24, 2020 issued in EP Application No. 19205924.4.

European Search Report dated Mar. 24, 2020 issued in EP Application No. 19207979.6.

United States Office Action dated Mar. 25, 2021 issued in co-pending related U.S. Appl. No. 16/666,979.

Chinese Office Action dated Jul. 26, 2021 issued in CN Application No. 1911042287.3.

Chinese Office Action dated Jul. 27, 2021 issued in CN Application No. 202010107767.X.

Chinese Office Action dated Jul. 28, 2021 issued in CN Application No. 202010107396.5.

Chinese Office Action dated Jul. 28, 2021 issued in CN Application No. 202010107406.5.

Chinese Office Action dated Jul. 28, 2021 issued in CN Application No. 202010107479.4.

Chinese Office Action dated Jul. 28, 2021 issued in CN Application No. 202010107792.8.

Chinese Office Action dated Aug. 2, 2021 issued in CN Application No. 201911087064.9.

(56) References Cited

OTHER PUBLICATIONS

Chinese Office Action dated Aug. 2, 2021 issued in CN Application No. 202010107397.X.
Chinese Office Action dated Aug. 2, 2021 issued in CN Application No. 202010107499.1.
United States Notice of Allowance dated Nov. 23, 2021 issued in co-pending related U.S. Appl. No. 16/795,923.

* cited by examiner

ENAMEL COMPOSITION, METHOD OF PREPARING SAME, AND COOKING APPLIANCE

CROSS-REFERENCE TO RELATED APPLICATION(S)

This application claims priority to and the benefit of Korean Patent Application No. 10-2018-0137475, filed in Korea on Nov. 9, 2018, the disclosure of which is incorporated herein by reference in its entirety.

BACKGROUND

1. Field

The present disclosure relates to an enamel composition that may be used in cooking appliance, a method of preparing the enamel composition, and a cooking appliance including the enamel composition.

2. Background

A porcelain enamel (also referred to simply as an "enamel") may be prepared by applying a glassy glaze or other glass enamel substance to a surface of a metal plate. Certain types of porcelain enamels may be used in cooking appliances, such as ovens and microwave ovens. Certain types of cooking appliances, such as electric ovens and gas ovens, cook food using a heating source. In a cooking appliance having a heating source, contaminants and the like generated during the cooking process may cling to the inner wall of a heated cavity of the cooking appliance, the inner wall should be to be cleaned periodically. When applied to the inner wall of the cavity of a cooking appliance, porcelain enamel allows for easier removal of attached contaminants from the cooking appliance. For example, pyrolysis methods (e.g., using high temperature) for burning contaminants to ashes may be used to clean the inner wall of a cavity, and enamel compositions including certain components, such as $P_2O_5$, $SiO_2$, $B_2O_3$, etc. may be used with pyrolysis methods for removing contaminants.

However, conventionally used enamel compositions may require a large amount of energy to achieve a relatively high temperature conditions (e.g., a temperature range 450 to 500° C.) for pyrolysis, and smoke make be undesirably generated while contaminants are burned at high temperature conditions in the pyrolysis cleaning methods. In addition, the cleaning of conventional enamel compositions may be cumbersome even with pyrolysis method. For example, the removal of oily contaminants, such as those occurring from cooking beef, pork, or poultry, may include soaking the contaminants in water for a certain period of time.

Further, an enamel composition should provide sufficient adhesion with a steel sheet substrate along the inner wall of a cavity of a cooking appliance, and may contain components, such as Co and Ni, to improve adhesion. However, these components may be relatively expensive and may also degrade the cleaning performance of the porcelain enamel when contained in a large amount.

BRIEF DESCRIPTION OF THE DRAWINGS

Embodiments will be described in detail with reference to the following drawings in which like reference numerals refer to like elements, and wherein.

DETAILED DESCRIPTION

Figure 1:
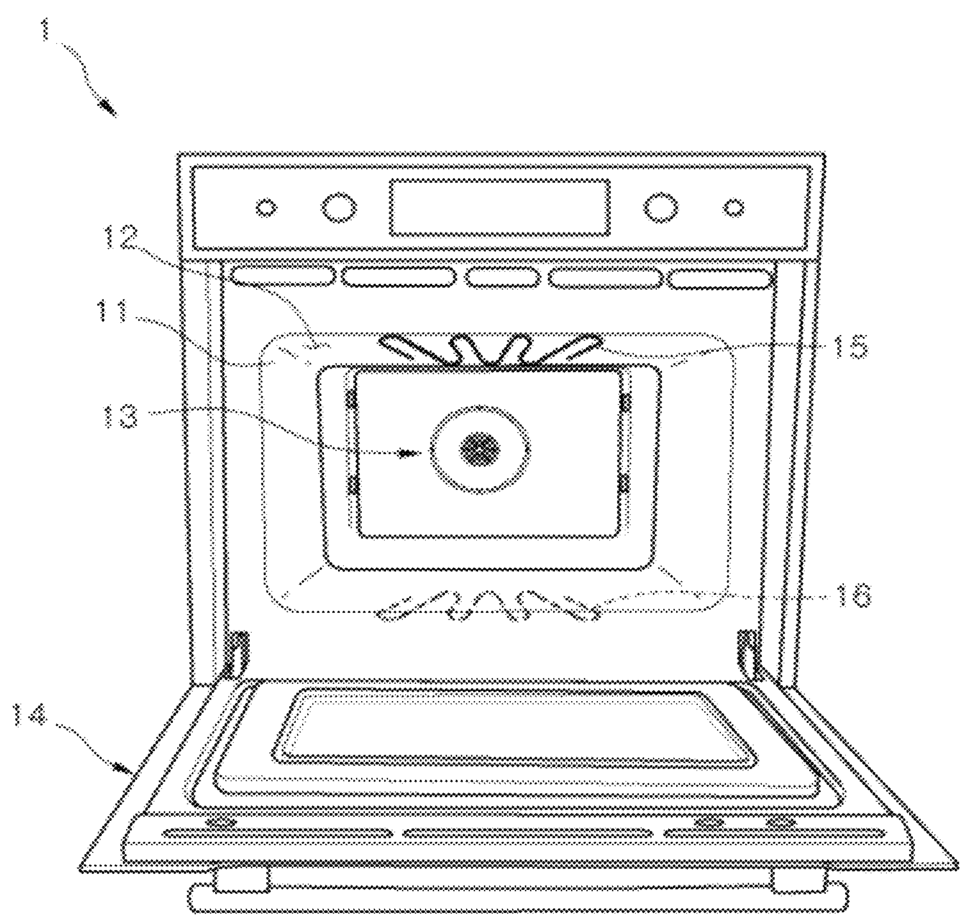
FIG. 1 is a front view of a cooking appliance according to an embodiment of the present disclosure.

An enamel composition according to an example of the present disclosure is now described. For example, the enamel composition in certain implementations of the present disclosure may contain: $SiO_2$ at 25 to 50 wt %; $B_2O_3$ at 1 to 15 wt %; one or more selected from a group of $Li_2O$, $Na_2O$, $K_2O$, and NaF at 10 to 30 wt %; ZnO at 1 to 15 wt %; $MoO_3$ at 1 to 15 wt %; and one or more selected from a group of $TiO_2$, $Bi_2O_3$, NiO, $Co_3O_4$, and $CeO_2$ at 10 to 30 wt %.

$SiO_2$ is a component that may constitute a glass structure and may be used in an enamel composition to improve the chemical resistance of the enamel composition and to facilitate the expression of the characteristics of a catalytic metal oxide by strengthening the skeleton of the glass structure. Since catalytic metal oxides may be relatively inferior in heat resistance or chemical resistance compared to other components, the catalytic metal oxides typically cannot be used in a relatively large amount in enamel compositions. However, since the $SiO_2$ structure has a relatively large pore size, $SiO_2$ can used in an appropriate amount in a glass composition to improve the solubility of a catalytic metal oxide in glass. Accordingly, when the content ratio of $SiO_2$ and one or more catalytic metal oxide is properly adjusted in a glass composition, certain desirable characteristics of the catalytic metal oxide (e.g., improved cleaning and adhesion with the steel plate) can be achieved while undesirable characteristics can be minimized such that relatively excellent heat resistance and relatively excellent chemical resistance can also exhibited by the glass. In one example, the $SiO_2$ may be contained at 25 to 50 wt % in the enamel composition. When the content of $SiO_2$ exceeds 50 wt %, the addition of other components may be hindered and cleaning performance may be consequently lowered. When the content of $SiO_2$ is less than 25 wt %, the composition of the silicate-based glass according to the present disclosure may be disrupted, such that heat resistance and chemical resistance may be reduced.

$B_2O_3$ is a component that may act as a glass-forming agent and may serve to uniformly dissolve the components of the enamel composition. In addition, $B_2O_3$ may improve coating ability by controlling the coefficient of thermal expansion and the fusion flow of the enamel composition. Furthermore, $B_2O_3$ may help to maintain an appropriate viscosity during the firing of enamel and to control the glass composition such that crystallization does not occur. In certain examples of the present disclosure, $B_2O_3$ may be contained at 1 to 15 wt % in the enamel composition. When the content of $B_2O_3$ exceeds 15 wt %, the addition of other components may be hindered and cleaning performance may be lowered. When the content of $B_2O_3$ is less than 1 wt %, the above-described benefits of this component may not be achieved, such that the composition of glass may be disrupted and/or crystallization of the glass composition may occur.

Certain components, such as $Li_2O$, $Na_2O$, $K_2O$, and NaF serve to improve the cleanability of the enamel composition, such as to minimize adhesion of contaminants to the enamel. Certain implementations described herein may include one or more of $Li_2O$, $Na_2O$, $K_2O$, and NaF that are contained at 10 to 30 wt % in the enamel composition. When the content of the one or more of $Li_2O$, $Na_2O$, $K_2O$, and NaF exceeds 30 wt %, the coefficient of thermal expansion of glass may significantly increase, making it difficult to match the coefficient of thermal expansion of the substrate such that enamel may separate from the steel plate. When the content of the one or more of $Li_2O$, $Na_2O$, $K_2O$, and NaF is less than 10 wt %, cleaning performance may be lowered.

In certain enamels described in the present disclosure, the $SiO_2$ and the $B_2O_3$ may act as network-forming oxides, the above-described alkali metal oxides may act as a network-modifying oxide, and ZnO acts as an intermediate oxide for balancing these two types of metal oxides. In the present disclosure, ZnO may be contained at 1 to 15 wt % in the enamel composition. When the content of ZnO exceeds 15 wt %, the difficulty of vitrification may be increased, and thermal properties may be degraded. On the other hand, when the content of ZnO is less than 1 wt %, since the ability of the enamel composition to spread during firing may be reduced and a non-uniform coating may be obtained, such that the surface properties and the coating ability of the coating layer may be degraded.

In the silicate-based enamel composition of certain examples described in the present disclosure, $MoO_3$ may serve to maximize the cleanability of the enamel through a catalytic activity. In addition, the Mo component of $MoO_3$ may promote a chemical reaction between the Si component of the enamel and the Fe component of a steel sheet substrate. Accordingly, $MoO_3$ may help to realize both the excellent adhesion and the excellent cleanability of the enamel coating layer. To describe $MoO_3$'s ability to impart excellent adhesion to the enamel coating layer in more detail, as local cells are formed at the interface between the steel sheet substrate and the enamel coating layer, Mo may precipitate and Fe may be ionized and removed, thereby forming roughness at the interface. Consequently, the glass component of the enamel may penetrate into holes formed due to the ionization and removal of Fe, and a chemical reaction between the Si component of the enamel and the Fe component of the steel sheet substrate may occurs at high density. Subsequently, as the Si component of the enamel and the Fe component of the steel sheet substrate form chemical bonds with each other at high density, the adhesion of the enamel coating layer to the steel sheet substrate may be better realized. $MoO_3$ may be contained at 1 to 15 wt % in the enamel composition. When the content of $MoO_3$ exceeds 15 wt %, the addition of other components may be hindered, which may disrupt the composition of glass. When the content of $MoO_3$ is less than 1 wt %, the occurrence of a catalytic reaction may be reduced such that cleaning performance may be lowered. In order to improve adhesion to a steel sheet substrate and ensure excellent cleaning performance at the same time and in consideration of its relationship with other components, $MoO_3$ is contained at 3 to 12 wt % in the enamel composition, and more preferably at 4 to 8 wt % in the enamel composition of the present disclosure.

$TiO_2$, $Bi_2O_3$, NiO, $Co_3O_4$, and $CeO_2$ are components which can enhance the ability to clean certain contaminants, such as oils or sugars, and improve the adhesion of the enamel composition applied to a substrate. In the present disclosure, one or more of $TiO_2$, $Bi_2O_3$, NiO, $Co_3O_4$, and $CeO_2$ may be contained at 10 to 30 wt % in the enamel composition. When the content of one or more of $TiO_2$, $Bi_2O_3$, NiO, $Co_3O_4$, and $CeO_2$ exceeds 30 wt %, the addition of other components is hindered, and cleaning performance may be lowered. When the content of one or more of $TiO_2$, $Bi_2O_3$, NiO, $Co_3O_4$, and $CeO_2$ is less than 10 wt %, the ability to clean contaminants such as oils or sugars may be lowered, and the adhesion to a substrate may be reduced. To provide a silicate-based component composition ratio for attaining excellent heat resistance and excellent chemical durability as well as excellent cleaning performance, the enamel composition in one implementation of the present disclosure may contain the $TiO_2$ at 5 to 20 wt % and the NiO and the $Co_3O_4$ at 2 wt % or less. Accordingly, the enamel composition in this example can realize sufficient adhesion to a substrate and sufficient cleanability even though it contains only a small amount of (or even no) Ni and Co components, which are relatively expensive and may provide certain undesirable performance attributes.

Due to having the above-described novel composition ratio, the enamel composition according to certain example described in the present disclosure may provide relatively easy cleaning of sugary contaminants at a temperature range of 350 to 380° C., which is about 100° C. lower than the temperature conditions typically used with conventional enamel compositions. Accordingly, when the enamel composition in certain examples of the present disclosure is used, there is an effect of saving energy and shortening cleaning time. In addition, with regard to oily contaminants, the enamel composition in certain examples of the present disclosure may provide ease of cleaning at relatively lower temperature ranges (e.g., at room temperature instantly) without require soaking of the oily contaminants in water, and thus advantageously provides for improved ease of maintaining the hygiene of the cooking appliance.

Figure 4:
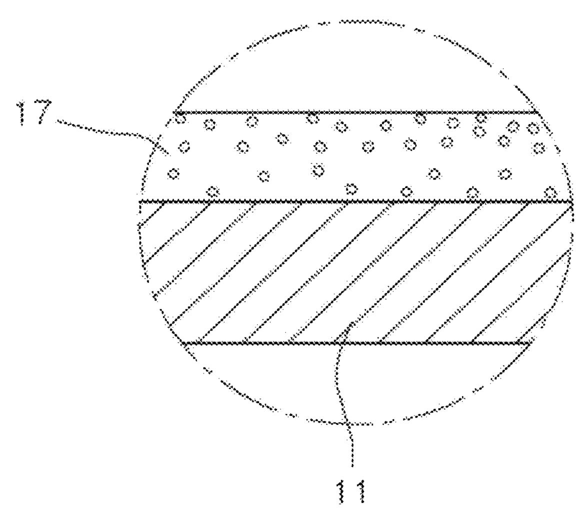
FIG. 4 is an enlarged cross-sectional view of a portion of the inner surface of the door of the cooking appliance according to FIG. 1.
Figure 5:
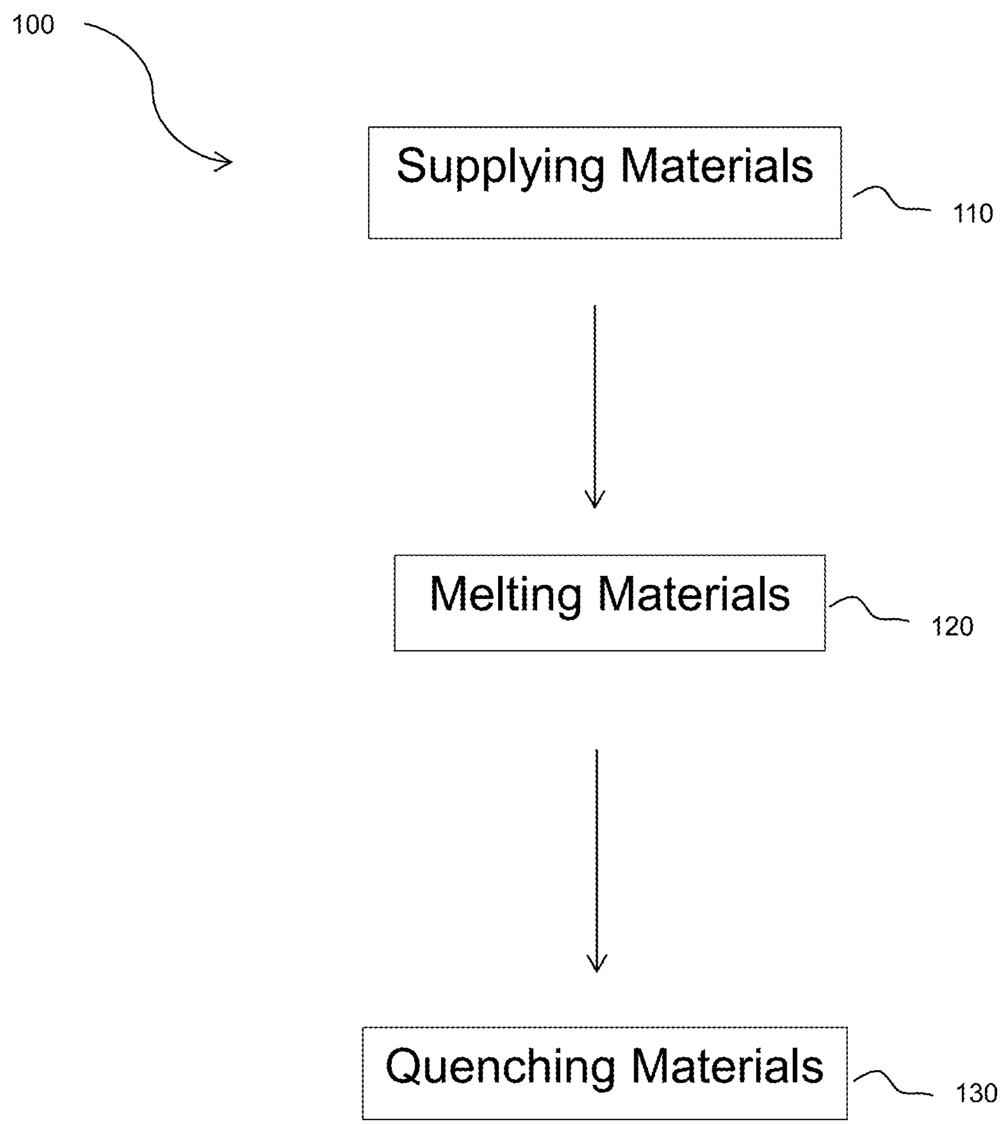
FIG. 5 is a flow diagram illustrating a method for preparing an enamel composition according to one exemplary embodiment of the present disclosure.

FIG. 4 depicts a method 100 of preparing an enamel composition according to the present disclosure. The method of preparing the enamel composition may include: supplying materials for an enamel composition, including $SiO_2$ at 25 to 50 wt %; $B_2O_3$ at 1 to 15 wt %; one or more of $Li_2O$, $Na_2O$, $K_2O$, and NaF at 10 to 30 wt %; ZnO at 1 to 15 wt %; $MoO_3$ at 1 to 15 wt %; and one or more of $TiO_2$, $Bi_2O_3$, NiO, $Co_3O_4$, and $CeO_2$ at 10 to 30 wt % (S110), melting the materials for an enamel composition (S120); and quenching the molten materials for an enamel composition (S130), thereby forming the enamel composition.

Once thoroughly mixed, the materials for an enamel composition are subjected to melting in S120. In one example, the materials for an enamel composition may be melted at a temperature of 1,200 to 1,400° C. In addition, the materials for an enamel composition may be melted for one to two hours, in one example. Subsequently, the molten materials for an enamel composition may be quenched in S130 by a quenching roller by using a chiller or the like. As a result, the enamel composition can be formed.

Next, the enamel composition of the present disclosure may be applied to one surface of an object to be coated with the enamel composition. The object to be coated may be part or all of a metal plate, a glass plate, or a cooking appliance. For example, the enamel composition may be applied to the inner surface of the cavity of a cooking appliance or to the inner surface of the door of a cooking appliance.

Referring to FIG. 1, the cooking appliance according to the present disclosure includes a cavity 11 in which a cooking chamber is provided, a door 14 for selectively opening the cooking chamber, at least one heating source 13, 15, and/or 16 for supplying heat for heating food in the cooking chamber, and a coating layer formed by applying the enamel composition of the present disclosure to the inner surface of the cavity 11 or to the inner surface of the door 14.

The cavity 11 may be formed in a hexahedral shape with an openable front side. The heating source(s) 13, 15, and/or 16 may include a convection fan assembly 13 for discharging heated air into the cavity 11, an upper heater 15 provided at an upper portion of the cavity 11, and/or a lower heater 16 provided at a lower portion of the cavity 11. The upper heater 15 and the lower heater 16 may be provided on the inside or the outside of the cavity 11. In other example, the cooking appliance may exclude one or more of the convection fan assembly 13, the upper heater 15, or the lower heater 16. For example, the cooking appliance may only include any one or more of the convection fan assembly 13, the upper heater 15, or the lower heater 16.

Figure 3:
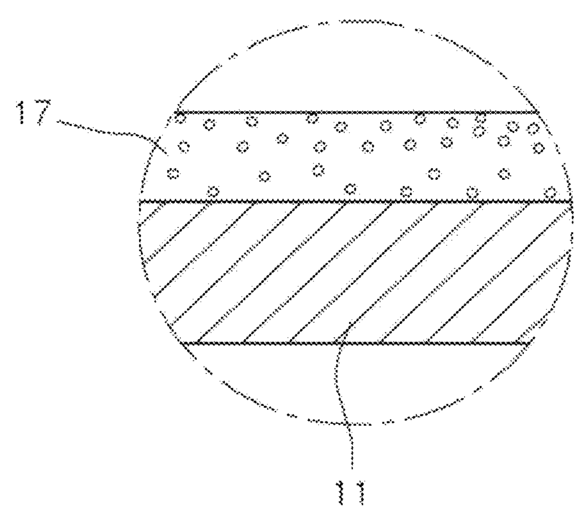
FIG. 3 is an enlarged cross-sectional view of a portion of the inner surface of the cavity of the cooking appliance according to FIG. 1.

Referring to FIGS. 3 and 4, the enamel composition of the present disclosure may be applied to one or more of the inner surface of the cavity 11 or the inner surface of the door 14 of the cooking appliance by, for example, a dry process or a wet process. The cavity 11 and the door 14 may be formed of a metal plate, and a coating layer 17 or 18 formed using the enamel composition of the present disclosure may be directly applied, as at least one layer, to the metal plate.

In the dry process, the materials for an enamel composition may be dispersed in an organic binder, and then the mixture of the materials for an enamel composition and the organic binder may be milled in a ball mill to prepare a frit. In the wet process, the materials for an enamel composition may be dispersed in water ($H_2O$) and a pigment, and then the mixture of the materials for an enamel composition, the water ($H_2O$), and the pigment may be milled in a ball mill to prepare a frit.

Afterward, the frit prepared by the dry process or the wet process may be applied to the inner surface of the cavity 11 or the inner surface of the door 14 of the cooking appliance by a spray method. The applied frit may be fired, for example, at a temperature of 600 to 900° C. for 100 to 450 seconds to provide a coating on the inner surface of the cavity 11 or the inner surface of the door 14 of the cooking appliance.

Hereinafter, specific embodiments of the present disclosure will be described with reference to certain examples. For example, enamel compositions having composition ratios shown in Table 1 were prepared. The raw materials for each component were thoroughly mixed for three hours in a V-mixer. Here, as the raw materials for $Na_2O$, $K_2O$, and $Li_2O$, $Na_2CO_3$, $K_2CO_3$, and $Li_2CO_3$ were respectively used, and the rest of the components, those listed in Table 1 were used. The mixture of the materials was sufficiently melted at 1,300° C. for 1.5 hours and quenched on a quenching roller to obtain glass cullet. After the initial particle size of the glass cullet obtained by the above-described process was adjusted using a ball mill, the glass cullet was crushed using a jet mill for about five hours, and the particle size thereof was adjusted to 45 μm or less by passing it through a 325-mesh sieve (in accordance with ASTM C285-88) to prepare a frit (powder).

TABLE 1

| Component | Examples | | | | | | | Comparative Examples | | |
|---|---|---|---|---|---|---|---|---|---|---|
| (wt %) | 1 | 2 | 3 | 4 | 5 | 6 | 7 | 1 | 2 | 3 |
| $SiO_2$ | 42 | 36 | 34.26 | 28.94 | 30.25 | 32.15 | 33.11 | 38.31 | 37.28 | 37.28 |
| $B_2O_3$ | 7.32 | 10.32 | 10.79 | 11.01 | 11.01 | 10.22 | 12.01 | 13.11 | 13.11 | 13.11 |
| $Na_2O$ | 14 | 10.11 | 11.59 | 11.82 | 10.25 | 9.99 | 11.59 | 10.75 | 10.75 | 10.75 |
| $K_2O$ | 6.13 | 6.13 | 3.86 | 3.94 | 3.94 | 3.84 | 4.04 | 6.52 | 6.52 | 6.52 |
| $Li_2O$ | 2.39 | 2.39 | 1.3 | 1.32 | 1.32 | 1.32 | 1.05 | 2.54 | 2.54 | 2.54 |
| NaF | 3.41 | 3.41 | 3.24 | 3.31 | 3.31 | 3.31 | 3.24 | 3.62 | 3.62 | 3.62 |
| $TiO_2$ | 19 | 13.32 | 12.68 | 12.93 | 12.93 | 12.18 | 12.68 | 14.17 | 14.17 | 14.17 |
| $Co_3O_4$ | — | — | 1.27 | 1.29 | 1.11 | 1.11 | 1.27 | — | 1.03 | — |
| NiO | — | — | 0.64 | 0.65 | 0.65 | 0.65 | 0.62 | — | — | 1.03 |
| ZnO | 4 | 10.33 | 9.82 | 10.02 | 10.02 | 10.02 | 9.82 | 10.98 | 10.98 | 10.98 |
| $MoO_3$ | 1.75 | 3.83 | 7.29 | 4.71 | 5.15 | 5.15 | 7.31 | — | — | — |
| $Bi_2O_3$ | — | 2.83 | 1.98 | 8.77 | 8.77 | 8.77 | 1.98 | — | — | — |
| $CeO_2$ | — | 1.33 | 1.28 | 1.29 | 1.29 | 1.29 | 1.28 | — | — | — |

Using a corona discharge gun, each of the frits prepared using the enamel compositions according to Examples 1 to 7 and Comparative Examples 1 to 3 was sprayed on a 200 mm×200 mm low-carbon steel sheet having a thickness of 1 mm or less. The voltage of the discharge gun was controlled to a condition of 40 to 100 kV, and the amount of frit sprayed on a low-carbon steel sheet was 300 g/m2. The low-carbon steel sprayed with frit was fired at a temperature of 830 to 870° C. for 300 to 450 seconds to form a coating layer on one surface of the low-carbon steel. Here, the coating layer was formed to a thickness of about 80 to 250 μm. As a result, the test specimens according to Examples 1 to 7 and Comparative Examples 1 to 3 were obtained.

The performance of the test specimens according to Examples and Comparative Examples was evaluated as follows, and the results are summarized in Table 3. Using a brush, a thin layer of 1 g of chicken oil as a contaminant was uniformly applied to a surface of a test specimen prepared by coating a 100 mm×100 mm metal substrate with an enamel composition. The contaminated test specimen was then placed in a thermostat and was maintained at a temperature of 250 to 290° C. for one hour to fix the contaminant thereto. After the contaminant was fixed, the test specimen was allowed to cool naturally, a degree of hardening was determined, and the hardened chicken oil was wiped off with a force of 3 kgf or less using a frying pan cleaning sponge moistened with room-temperature water. In this case, a flat bottom bar with a diameter of 5 cm was used to evenly distribute the force of wiping the contaminated surface of the test specimen.

Furthermore, using a brush, a thin layer of 1 g of cherry pie as a contaminant was uniformly applied to a surface of a test specimen prepared by coating a 100 mm×100 mm metal substrate with an enamel composition. The contaminated test specimen was then placed in a thermostat and was maintained at a temperature of about 220° C. for 30 minutes to fix the contaminant thereto. After the contaminant was fixed, the test specimen was allowed to cool naturally, and then the contaminant was burned at 350° C. for one hour. Subsequently, the hardened cherry pie contaminant was wiped off with a force of 3 kgf or less using a frying pan cleaning sponge moistened with room-temperature water. In this case, a flat bottom bar with a diameter of 5 cm was used to evenly distribute the force of wiping the contaminated surface of test specimen.

The number of round trips for wiping the test specimens was counted and is expressed as the "number of round trips for cleaning", and a cleaning performance evaluation index is shown in Table 2.

TABLE 2

| Number of round trips for cleaning | Level |
|---|---|
| 1 to 5 | LV. 5 |
| 6 to 15 | LV. 4 |
| 16 to 25 | LV. 3 |
| 26 to 50 | LV. 2 |
| 51 or more | LV. 1 |

Figure 2:
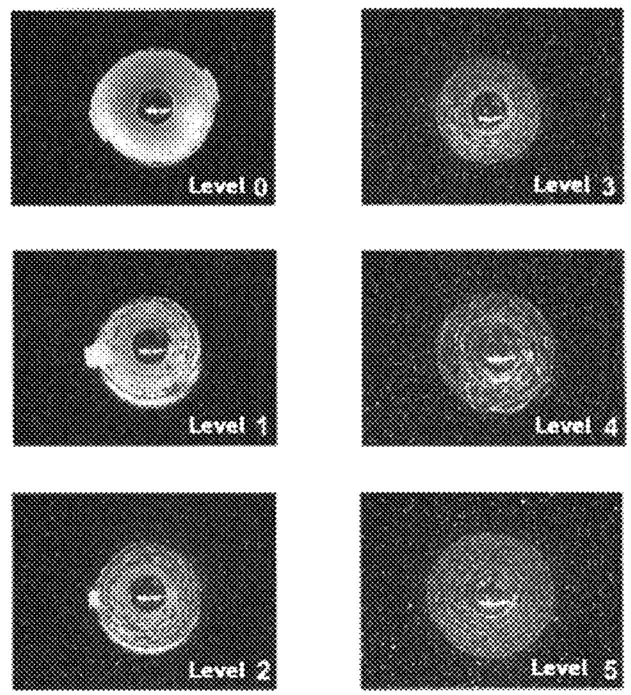
FIG. 2 shows photographic images illustrating an adhesion measurement standard of an enamel coating layer.

The test specimens were tested to evaluate the adhesion of the enamel compositions to a steel sheet substrate. The adhesion was evaluated as follows: a test specimen was placed in the center of the sample stage of a Dupont Impact Tester (in accordance with ASTM D1794 and JIS K5400), a steel ball of about 25.4 mm (1 inch) in diameter was installed in the center of the flat part of the test specimen, a piece of iron weighing 2 kg was freely dropped from a height of 300 mm, and a degree of peeling was determined. The adhesion levels were determined based on the criteria shown in FIG. 2, which depicts respective different levels 0-5 of adhesion as represented by respective amounts of damage to the enamel during the impact test.

TABLE 3

| | Examples | | | | | | | Comparative Examples | | |
|---|---|---|---|---|---|---|---|---|---|---|
| | 1 | 2 | 3 | 4 | 5 | 6 | 7 | 1 | 2 | 3 |
| Cleaning performance against contamination with chicken oil | LV.3 | LV.5 | LV.5 | LV.5 | LV.5 | LV.5 | LV.5 | LV.2 | LV.2 | LV.2 |
| Cleaning performance against contamination with cherry pie | LV.3 | LV.3 | LV.4 | LV.4 | LV.4 | LV.4 | LV.4 | LV.1 | LV.1 | LV.1 |
| Adhesion | LV.3 | LV.4 | LV.5 | LV.5 | LV.5 | LV.5 | LV.5 | LV.0 | LV.0 | LV.0 |

As shown in Table 3, it can be seen that Examples 1-7 that were generated according to the present disclosure exhibited relatively excellent adhesion and relatively excellent cleaning performance in comparison to the comparative examples. On the other hand, it has been confirmed that in Comparative Examples 1-3, since an optimized silicate-based component composition ratio was not applied and the composition of glass was disrupted, relatively low cleaning performance and relatively low adhesion, compared to the Examples 1-7, were exhibited.

Due to the inclusion of a novel silicate-based glass composition, the enamel composition of the present disclosure may be cleanable at a temperature range that is about 100° C. lower than the higher temperature conditions used in conventional enamel compositions, and thus provides an effect of saving energy. In addition, since the time required to reach a temperature at which cleaning is possible is reduced, the enamel composition of the present disclosure has an advantageous effect that cleaning time is also saved. Moreover, since the enamel composition of the present disclosure is cleanable at room temperature without soaking contaminants in water, simple cleaning by a user is possible, and the hygiene of the cooking appliance may be improved.

In addition, since, particularly, the content of a Mo-containing oxide in the enamel composition of the present disclosure is properly adjusted, adhesion with a steel sheet substrate can be improved, and at the same time, excellent cleaning performance can be achieved. Furthermore, since the enamel composition of the present disclosure has an optimized silicate-based component composition ratio, it is excellent in all of cleanability, heat resistance, and chemical durability. In addition, the enamel composition of the present disclosure can be directly applied as a single layer to a steel sheet substrate without using an interposing buffer layer, and thus provides an effect of convenient porcelain enamel preparation.

Aspects of the present disclosure provide an enamel composition that is cleanable at temperatures lower than the high temperature conditions required by the existing enamel compositions and allows contaminants to be removed at room temperature without soaking the contaminants in water. Aspects of the present disclosure further provide an enamel composition capable of providing improved adhesion with a steel sheet substrate and ensuring excellent cleaning performance. In addition, aspects of the present disclosure provide an enamel composition that has excellent heat resistance and excellent chemical durability as well as excellent cleanability.

In order to provide an enamel composition that is cleanable at temperatures lower than the high temperature conditions associated with conventional enamel compositions and also allows contaminants to be removed at room temperature without soaking the contaminants in water, the enamel composition according to an example provided in the present disclosure may contain: $SiO_2$ at 25 to 50 wt %; $B_2O_3$ at 1 to 15 wt %; one or more selected from among $Li_2O$, $Na_2O$, and $K_2O$, and NaF at 10 to 30 wt %; ZnO at 1 to 15 wt %; $MoO_3$ at 1 to 15 wt %; and one or more selected from among $TiO_2$, $Bi_2O_3$, NiO, $Co_3O_4$, and $CeO_2$ at 10 to 30 wt %.

In addition, in order to provide a novel enamel composition capable of providing improved adhesion with a steel sheet substrate and ensuring excellent cleaning performance, the enamel composition of the present invention may contain the $MoO_3$ at 4 to 8 wt %.

Furthermore, in order to provide a novel enamel composition that has excellent heat resistance and excellent chemical durability as well as excellent cleanability, the enamel composition of the present disclosure may contain the $TiO_2$ at 5 to 20 wt % and the NiO and the $Co_3O_4$ at 2 wt % or less.

While the present disclosure has been described above, it is apparent that the disclosure is not limited to the embodiments disclosed herein and that various modifications may be made by those skilled in the art within the scope of the technical idea of the disclosure. In addition, although the effects of the configurations of the disclosure are not explicitly described in the description of the embodiments of the disclosure, it is apparent that the effects predictable by the configurations should also be recognized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An enamel composition comprising:

$SiO_2$ in an amount ranging from about 25 to 50 wt %;

$B_2O_3$ in an amount ranging from about 1 to 15 wt %;

one or more of $Li_2O$, $Na_2O$, $K_2O$, or NaF in an amount ranging from about 10 to 30 wt %;

ZnO in an amount ranging from about 1 to 15 wt %;

$MoO_3$ in an amount ranging from about 1 to 15 wt %;

NiO, $Co_3O_4$ and one or more of $TiO_2$, $Bi_2O_3$, or $CeO_2$ in an amount ranging from about 10 to 30 wt %, the weight percentages being expressed relative to the enamel composition, wherein NiO and $Co_3O_4$ are present in an amount that is 2 wt % or less of the enamel composition.

2. The enamel composition of claim 1, wherein $MoO_3$ is present in an amount ranging from about 4 to 8 wt % of the enamel composition.

3. The enamel composition of claim 1, wherein $TiO_2$ is present in an amount ranging from about 5 to 20 wt % of the enamel composition.

4. A cooking appliance, comprising:

a cavity in which a cooking chamber is provided;

a door that selectively opens and closes the cooking chamber;

at least one heating source which supplies heat to the cooking chamber; and a coating layer formed of the enamel composition of claim 1 and provided on at least one of an inner surface of the cavity or an inner surface of the door.

5. A method of preparing an enamel composition, the method comprising:

supplying materials for the enamel composition;

melting the materials for the enamel composition; and quenching the melted materials for the enamel composition, wherein the materials for the enamel composition include:

$SiO_2$ in an amount ranging from about 25 to 50 wt %;

$B_2O_3$ in an amount ranging from about 1 to 15 wt %;

one or more of $Li_2O$, $Na_2O$, $K_2O$, or NaF in an amount ranging from about 10 to 30 wt %;

ZnO in an amount ranging from about 1 to 15 wt %;

$MoO_3$ in an amount ranging from about 1 to 15 wt %;

NiO, $Co_3O_4$ and one or more of $TiO_2$, $Bi_2O_3$, or $CeO_2$ in an amount ranging from about 10 to 30 wt %, the weight percentages being expressed relative to the enamel composition, wherein NiO and $Co_3O_4$ are present in an amount that is 2 wt % or less of the enamel composition.

6. The method of claim 5, wherein $MoO_3$ is present in an amount ranging from about 4 to 8 wt % of the enamel composition.

7. The method of claim 5, wherein $TiO_2$ is present in an amount of 5 wt % to 20 wt % of the enamel composition.

8. The method in claim 5, wherein melting the materials for the enamel composition includes melting the materials at about 1,200 to 1,400° C. for about one to two hours.

9. The method in claim 8, wherein melting the materials for the enamel composition includes melting the materials at about 1,300° C. for about 1.5 hours.

10. The method of claim 5, further comprising:

mixing the materials for about 3 hours before melting the materials.

11. The method of claim 5, wherein quenching the melted material includes quenching the melted materials using a quenching roller.

12. The method of claim 5, further comprising:

applying the enamel composition to at least one of an inner surface of a cavity of a cooking appliance or an inner surface a door of the cooking appliance.

13. The method of claim 12, wherein applying the enamel composition includes applying the enamel composition by a dry process that includes dispersing the quenched materials for the enamel composition in an organic binder, milling the quenched materials for the enamel composition and the organic binder to prepare a frit, and applying the frit to the at least one of the inner surface of the cavity of the cooking appliance or the inner surface the door of the cooking appliance.

14. The method of claim 12, wherein applying the enamel composition includes applying the enamel composition by a wet process that includes dispersing the quenched materials for the enamel composition in water and a pigment, milling the materials for the enamel composition, water, and the pigment to prepare a frit, and applying the frit to the at least one of the inner surface of the cavity of the cooking appliance or the inner surface the door of the cooking appliance.

15. The method of claim 12, wherein applying the enamel composition includes:

spraying a frit that includes the quenched materials for the enamel composition to the at least one of the inner surface of the cavity of the cooking appliance or the inner surface the door of the cooking appliance; and firing the sprayed frit.

16. The method of claim 15, wherein spraying the frit includes spraying about 300 g/m2 of the frit onto a steel sheet substrate.

17. The method of 15, wherein spraying the frit includes directly applying a single layer of the frit onto a steel sheet substrate without using an interposing buffer layer.

18. The method of claim 15, wherein the frit is applied to form a coating layer having a thickness of about 80 to 250 μm, and the frit is fired at about 600 to 900° C. for about 100 to 450 seconds.

* * * * *